United States Patent
Schildknecht

(10) Patent No.: US 7,269,467 B2
(45) Date of Patent: Sep. 11, 2007

(54) SHELF SYSTEM

(75) Inventor: Susanne Schildknecht, Bonn (DE)

(73) Assignee: Deutsche Post AG (DE)

( * ) Notice: Subject to any disclaimer, the term of this patent is extended or adjusted under 35 U.S.C. 154(b) by 84 days.

(21) Appl. No.: 10/389,172

(22) Filed: Mar. 14, 2003

(65) Prior Publication Data

US 2004/0104653 A1    Jun. 3, 2004

(30) Foreign Application Priority Data

Mar. 14, 2002    (DE) ................ 202 04 164 U

(51) Int. Cl.
G05B 19/18 (2006.01)
G05B 11/01 (2006.01)
G06F 17/00 (2006.01)
A47B 96/00 (2006.01)
G05B 1/00 (2006.01)
G05B 11/32 (2006.01)

(52) U.S. Cl. .............. 700/60; 700/243; 700/242; 700/231; 221/2; 221/7; 221/76; 221/130; 340/310.11; 312/352

(58) Field of Classification Search .......... 312/9.3, 312/319.5, 34.12, 34.11, 34.9, 352; 198/353; 221/90, 91; 700/244, 243, 60, 231

See application file for complete search history.

(56) References Cited

U.S. PATENT DOCUMENTS

| | | | | |
|---|---|---|---|---|
| 3,190,233 | A | * | 6/1965 | Welch ..................... 417/454 |
| 5,087,107 | A | * | 2/1992 | Fumanelli ................ 312/333 |
| 5,634,702 | A | * | 6/1997 | Fistonich ................ 312/270.3 |
| 6,011,999 | A | * | 1/2000 | Holmes .................... 700/231 |
| 6,105,004 | A | * | 8/2000 | Halperin et al. ............ 705/28 |
| 6,570,492 | B1 | * | 5/2003 | Peratoner .............. 340/310.01 |
| 6,624,757 | B1 | * | 9/2003 | Johnson ................ 340/825.52 |
| 6,785,589 | B2 | * | 8/2004 | Eggenberger et al. ...... 700/231 |
| 6,847,861 | B2 | * | 1/2005 | Wangu et al. ............. 700/242 |
| 6,963,791 | B1 | * | 11/2005 | Frederick et al. .......... 700/244 |

* cited by examiner

Primary Examiner—Anthony Knight
Assistant Examiner—Sunray Chang
(74) Attorney, Agent, or Firm—Connolly Bove Lodge & Hutz LLP

(57) ABSTRACT

A shelf system with computer-controlled compartment displays, whereby the displays indicate a number of articles to picked out of the compartment. The shelf system has a plurality of sliding shelves in that the shelves have at least one display element in their frontal area for order picking data. The shelf system is configured in such a way that a data exchange between the display elements and the control computer can take place irrespective of the relative position of the shelf vis-à-vis the other components of the shelf system.

7 Claims, 1 Drawing Sheet

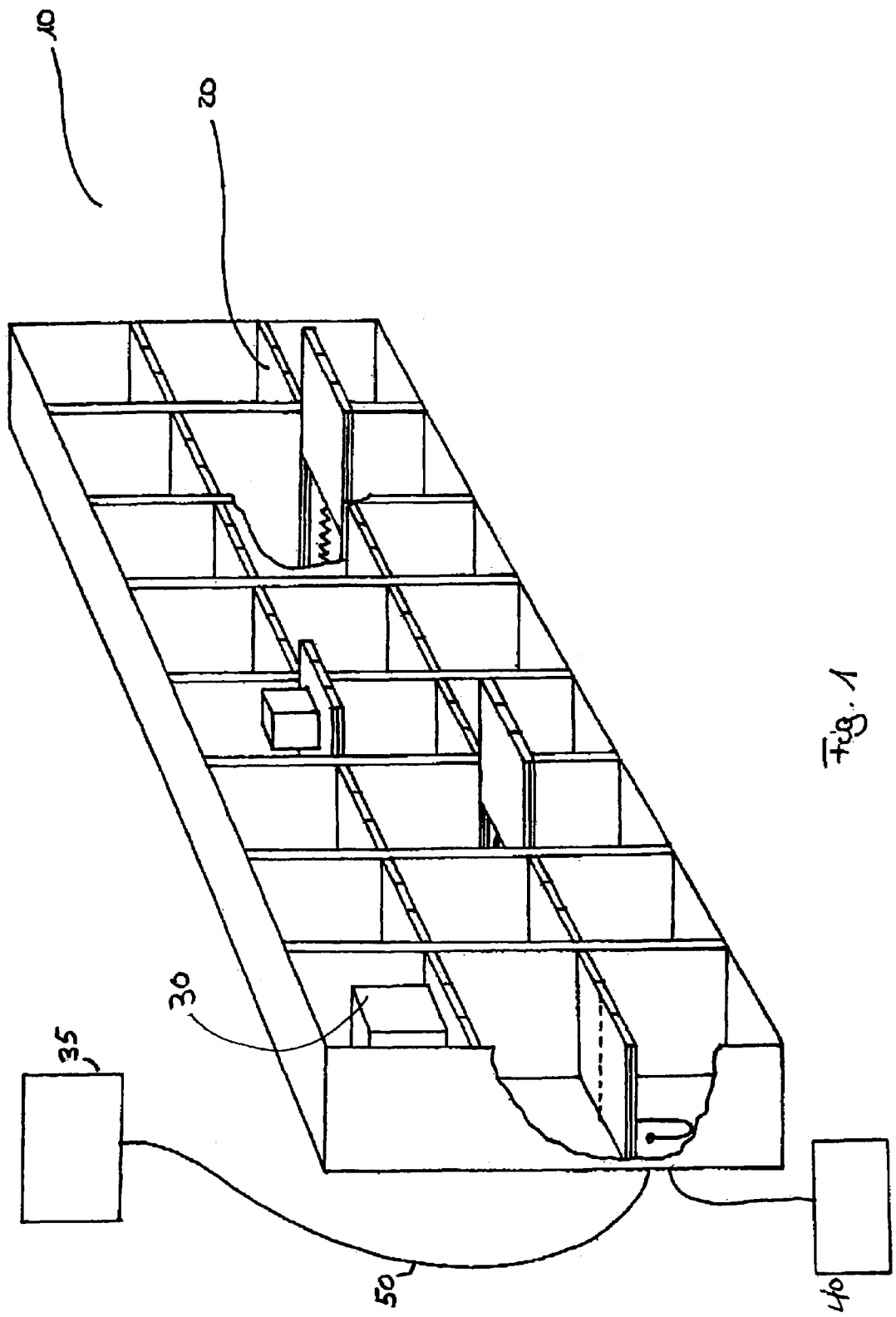

SHELF SYSTEM

BACKGROUND OF THE INVENTION

The invention relates to a shelf system with computer-controlled compartment displays.

German Preliminary Published Application DE 41 31 567 A1 discloses a shelf system of this type.

SUMMARY OF THE INVENTION

The shelf system described therein, using compartment displays arranged in the area of the bottom or top of the compartment, allows a safe and reliable orientation for an order picker who is taking an article from the shelf compartment.

The shelf system disclosed in German Preliminary Published Application DE 41 31 567 A1 extends parallel to the conveying path of a computer-controlled conveying system that synchronously moves order picking containers to the compartment displays. This approach reduces the risk of errors by the order picker.

It is the objective of the invention to further develop a shelf system of this type in such a way that the ordered article can be picked from the shelf system as simply and ergonomically as possible.

According to the invention, this objective is achieved in that the shelf boards provided with the display means are mounted so as to slide in the shelf system.

The invention provides for configuring the shelf system in such a way that the shelf system comprises a plurality of sliding shelves, that the shelves each have at least one display element in their frontal area for order picking data, and that the shelf system comprises data connection means which serve to connect the display elements to a control computer for these display elements, whereby the connection elements are configured in such a way that a data exchange between the display elements and the control computer can take place irrespective of the relative position of the shelf vis-à-vis the other components of the shelf system.

Preferably, the shelf system is configured in such a way that the data connection means is a data line having a length that allows a connection to the control computer even when the shelves are completely pulled out.

In order to achieve an effective and reliable protection of the data transfer cable and in order to avoid malfunctions when the shelves are pulled out, it is especially advantageous for at least sections of the cable to be laid in an armored conduit.

The mechanical reliability of the shelf system is preferably increased in that the shelves are mounted so as to slide in a guide rail.

In order to facilitate the handling, it is advantageous for at least some of the shelves to be connected to a device that automatically slides the shelves out of or back into the shelf system.

This is done in a first preferred embodiment in that at least some of the shelves are connected to at least one pressure-generating device.

Another, likewise preferred embodiment is characterized in that the pressure-generating device comprises a spring element.

Moreover, it is advantageous to configure the shelf system in such a way that the pressure-generating device comprises a gas pressure element.

Further advantages, special features and practical refinements of the invention ensue from the subordinate claims and from the representation below of a preferred embodiment that makes reference to the drawing.

DESCRIPTION OF THE FIGURES

FIG. 1 illustrates a shelf system in accordance with a preferred embodiment of the invention.

DESCRIPTION OF THE PREFERRED EMBODIMENT

The drawing shows a shelf system 10 according to the invention having shelves 20, whereby in the frontal area of the shelves 20, there is at least one display element 30 that serves to display the number of articles to be taken out of or to be placed into the compartment. A control computer 35 is connected to the display elements 30 by an armored data cable 50.

Using the shelf system shown, the articles can be picked in an especially simple and reliable manner, also ergonomically and with a high level of work safety.

For example, the shelves are connected to the shelf system via a pressure-generating device 40. By releasing a catch (not shown here), at least one shelf moves forward so that it is easier to take out the articles that are to be picked.

Of course, it is likewise possible to configure a shelf system according to the invention without mechanical means for automatically sliding the shelves out and back in. In this case, the shelves are slid out or back in manually.

With especially preferred embodiments among those presented here, the shelf as well as display elements that are attached to the shelf and that serve to control the order picking procedures can be brought into a position that is suitable for picking articles from the shelf.

The invention claimed is:

1. A shelf system comprising:
    a control computer;
    computer-controlled compartment displays, wherein the computer-controlled compartment displays indicate a number of articles to be taken out of/placed into the compartment;
    a plurality of sliding shelves, each having at least one display element in their frontal area for order picking data;
    data connection means to connect the at least one display element to the control computer for these display elements,
    whereby the data connection means exchanges data between the at least one display element and the control computer irrespective of the relative position of the shelf vis-à-vis the other components of the shelf system, and
    wherein the sliding shelves are connected to the shelf system by a pressure-generating device that automatically slides the shelves out of and back into the shelf system.

2. The shelf system according to claim 1, wherein the data connection means is a data line having a length that allows a connection to the control computer even when the shelves are completely pulled out.

3. The shelf system according to claim 2, wherein at least sections of the cable are laid in an armored conduit.

4. The shelf system according to claim 1, wherein the shelves are mounted so as to slide in a guide rail.

5. The shelf system according to claim 1, wherein at least some of the shelves are connected to at least one pressure-generating device.

6. The shelf system according to claim 1, wherein the pressure-generating device is a spring element.

7. The shelf system according to claim 1, wherein the pressure-generating device comprises a gas pressure element.

* * * * *